United States Patent

Okamoto et al.

[11] 4,038,824
[45] Aug. 2, 1977

[54] FLOW CONTROL APPARATUS OF MASTER CYLINDER

[75] Inventors: Toshiaki Okamoto, Chiryu; Yoshihisa Kato, Nagoya; Masashi Ban, Kariya, all of Japan

[73] Assignee: Aisin Seiki Kabushiki Kaisha, Japan

[21] Appl. No.: 591,832

[22] Filed: June 30, 1975

[30] Foreign Application Priority Data

July 9, 1974 Japan ............................ 49-81461[U]

[51] Int. Cl.² ........................................... F15D 1/10
[52] U.S. Cl. .................................. 60/591; 137/513.5; 138/40
[58] Field of Search ................. 137/501, 504, 513.5; 251/120; 138/44, 46, 40, 45, 48; 60/591, 590

[56] References Cited

U.S. PATENT DOCUMENTS

| | | | |
|---|---|---|---|
| 2,198,487 | 4/1940 | Sisk | 137/504 |
| 2,538,806 | 1/1951 | St. Clair | 137/504 X |
| 2,603,951 | 7/1952 | Ross | 60/590 |
| 2,770,948 | 11/1956 | Porter | 60/591 X |
| 3,060,958 | 10/1962 | Hedland | 137/504 X |
| 3,078,676 | 2/1963 | Blair | 60/590 X |
| 3,359,729 | 12/1967 | Guettier | 60/591 X |
| 3,431,944 | 3/1969 | Sakuma | 137/504 X |
| 3,493,270 | 2/1970 | Doerfler | 60/591 X |
| 3,503,417 | 3/1970 | Toda et al. | 137/504 X |
| 3,572,845 | 3/1971 | Johannesen | 60/591 X |

FOREIGN PATENT DOCUMENTS

| | | | |
|---|---|---|---|
| 304,232 | 3/1955 | Switzerland | 137/504 |
| 721,031 | 12/1954 | United Kingdom | 137/504 |

*Primary Examiner*—Harold W. Weakley
*Attorney, Agent, or Firm*—Oblon, Fisher, Spivak, McClelland & Maier

[57] ABSTRACT

A flow control apparatus for a brake master cylinder of a vehicle includes a valve chamber formed within a plug threadably secured to an outlet port of the master cylinder which is fluidically connected to the wheel cylinders of the vehicle, a flow control valve movably disposed within the valve chamber having projecting portions on one face of a flat portion thereof for providing a gap between the valve chamber wall and the valve in one end position of movement of the valve and a flow passage through the flat portion, a spring retainer secured within the inner end of the plug having a central opening for slidably receiving a central extension of the other face of the valve flat portion and a plurality of flow passages therethrough, and a compression spring between the other face of the valve portion and the spring retainer for normally maintaining the valve against the valve chamber wall with the projecting portions abutting thereagainst, whereby brake pedal depression and release alters the quantity of fluid flowing between the master cylinder and the wheel cylinders.

3 Claims, 1 Drawing Figure

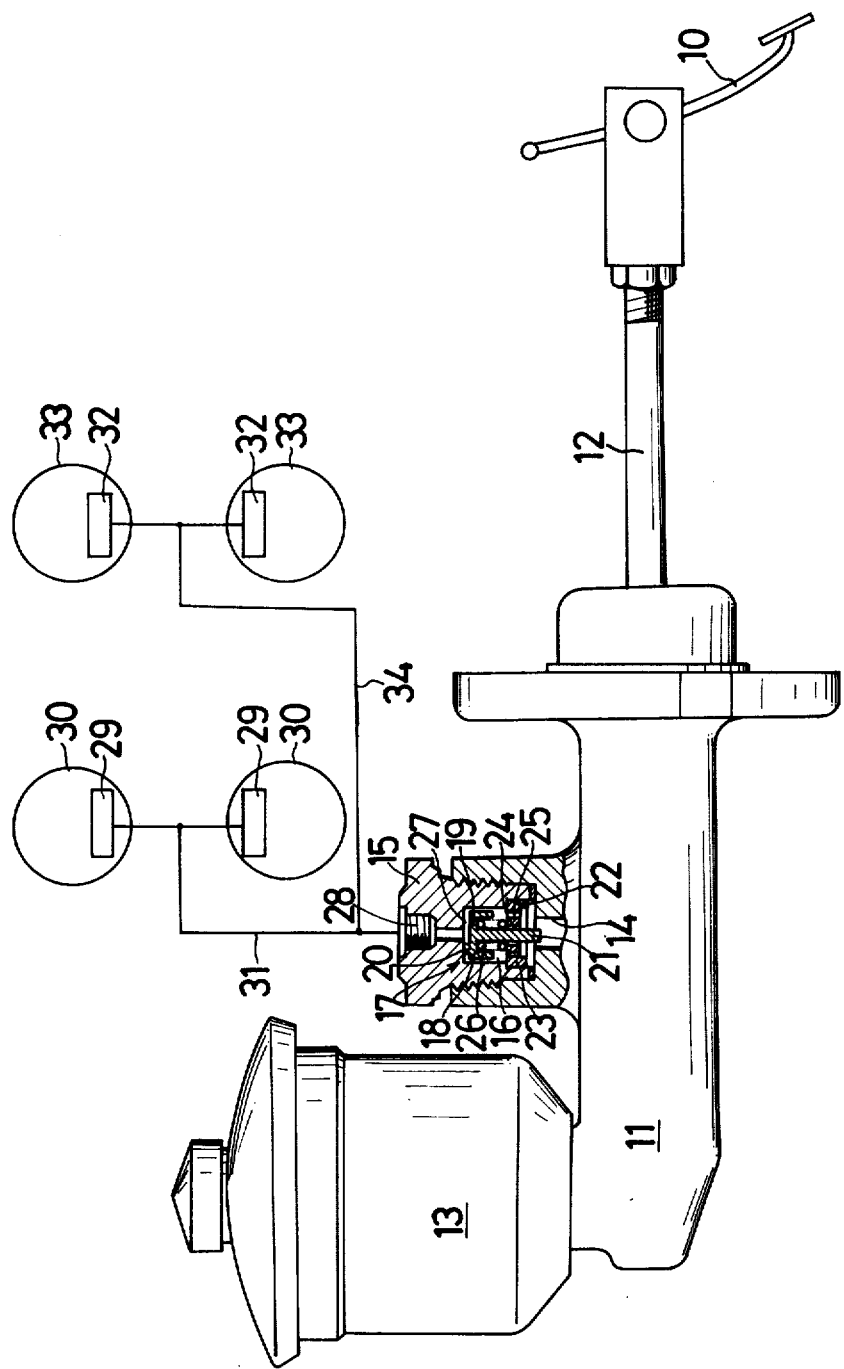

FLOW CONTROL APPARATUS OF MASTER CYLINDER

BACKGROUND OF THE INVENTION

1. Field of the Invention

The present invention relates generally to a flow control apparatus of a master cylinder, and more particularly to a flow control apparatus of a master cylinder for changing the quantity of braking fluid from the master cylinder to the wheel cylinders, and vice versa.

2. Description of the Prior Art

Conventionally, a valve chamber is formed at an outlet portion of a master cylinder, being fluidically connected to the wheel cylinders of an automotive vehicle, and a valve mechanism, including a valve compression spring, a spring retainer and such, is mounted in the valve chamber. A valve member for the outlet port of the chamber is threadably secured thereon from the outer side so that the valve mechanism heretofore employed becomes relatively large in size.

SUMMARY OF THE INVENTION

It is therefore an object of the present invention to provide an improved flow control apparatus of a master cylinder for obviating the above described conventional drawback.

Another object of the present invention is to provide a unique and highly simplified flow control apparatus of a master cylinder.

The foregoing and other objects, as well, are attained according to the present invention by a flow control apparatus for a brake master cylinder of a vehicle which includes a valve chamber formed with a plug threadably secured to an outlet port of the master cylinder which is fluidically connected to the wheel cylinders of the vehicle, a flow control valve movably disposed within the valve chamber having projecting portions on one face of a flat portion thereof for providing a gap between the valve chamber wall and the valve in one end position of movement of the valve and a flow passage through the flat portion, a spring retainer secured within the inner end of the plug having a central opening for slidably receiving a central extension of the other face of the valve flat portion and a plurality of flow passages therethrough, and a compression spring between the other face of the valve portion and the spring retainer for normally maintaining the valve against the valve chamber wall with the projecting portions abutting thereagainst, whereby brake pedal depression and release alters the quantity of fluid flowing between the master cylinder and the wheel cylinders. The flow when the valve is in the one end position is through the plurality of passages in the spring retainer, the flow passage in the valve and the gap, while the flow through the chamber when the valve is in its other position is only through the passages in the spring retainer and the valve.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein:

The sole FIGURE is a systematic view of a brake flow control system constructed according to the present invention, being shown partly in cross-section.

DETAILED DESCRIPTION OF A PREFERRED EMBODIMENT

Referring now to the sole FIGURE, the reference numeral 10 denotes a brake pedal adapted to be actuated manually by a vehicle driver and which is mechanically connected to one end of a main body of a master cylinder 11 through a rod 12. A reservoir tank 13 is shown being fixed to the other end of the main body 11 and an outlet port 14 is shown being formed in the main body of the master cylinder 11 intermediate its ends. A plug 15 is screwed into the outlet port 14 and a valve chamber 16 is formed in an inner portion of the plug 15.

A flow control valve 17, which is integrally constructed in the valve chamber 16, has a flat portion 18 at one end thereof, being provided with an oil passage 19 therethrough, and a plurality of projecting portions 20 are formed on the upper end surface of the flat portion 18 for contacting an inner wall of the plug 15. The flow control valve 17 has a longitudinal portion 21 formed integrally on the flat end portion, extending from the center of the lower end surface thereof, such that the flow control valve 17 has a T-shaped configuration. The flow control valve 17 is upwardly and downwardly movable within the valve chamber 16, as viewed in the FIGURE.

A spring retainer 22 disposed within the valve chamber 16 includes a flat portion 23 having a central passage 24 for receiving the longitudinal portion 21 of the flow control valve 17 and a plurality of oil passages 25 disposed thereabout. The spring retainer 22 is fixed within a stepped inner portion of the plug 15 by pressing so as to retain a compression spring 26 interposed between the lower end surface of the flat portion 18 of the flow control valve 17 and the upper end surface of the flat portion 23 of the spring retainer 22. The flow control valve 17 is normally urged upwardly by the compression spring 26 and therefore the projecting portions 20 of the flow control valve 17 are contacted with, or pressed against, the inner wall of the plug 15, with a gap 27 thus being provided between the inner wall of the plug 15 and the upper surface of the flat portion 18 of the flow control valve 17, as viewed in the only FIGURE.

An outlet port 28 formed in the plug 15 is fluidically connected to the front wheel cylinders 29, 29 of the front wheels 30, 30 of the vehicle via a conduit 31 and is fluidically connected to the rear wheel cylinders 32, 32 of the rear wheels 33, 33 thereof via another conduit 34.

The operation of the present invention will now be described hereinbelow in detail:

As is known, it is required to let air out of the master cylinder 11 and the front and rear wheel cylinders 29, 29 and 32, 32 respectively, upon newly assemblying a brake system or when repairing the master cylinder 11 and the front and rear wheel cylinders 29, 29, 32, 32, and so on, while hydraulic fluid must be supplied to the reservoir tank 13. At these times, such can be attained by repetitively supplying hydraulic fluid from the outlet port 14 to each of the wheel cylinders 29, 29, 32, 32 by depressing the brake pedal 10. However, when the brake pedal 10 is released, after depression thereof, hydraulic fluid is drawn from the reservoir tank 13 and also flows backwardly from each of the wheel cylinders 29, 29, 32, 32, at the same time, into the master cylinder 11.

In order to decrease the reflux of the hydraulic fluid from each of the wheel cylinders 29, 29, 32, 32 and to easily let air out of the master cylinder 11 or from each of the wheel cylinders 29, 29, 32, 32, the flow control valve 17 of the present invention is provided in the outlet port 14. In the case that hydraulic fluid is infused into the reservoir tank 13, the hydraulic fluid infused thereinto is transmitted into the outlet port 14 through the master cylinder 11. When the brake pedal 10 is depressed at this time, the hydraulic fluid supplied to the outlet port 14 is further transmitted to the valve chamber 16, by such depression of the brake pedal 10, via the plurality of oil passages 25 in the spring retainer 22. The hydraulic fluid supplied into the valve chamber 16 is transmitted to the wheel cylinders 29, 29 of the front wheels 30, 30 and the wheel cylinders 32, 32 of the rear wheels 33, 33 via the oil passage 19 in the flow control valve 17, the gap 27 formed between the plug 15 and the valve 17, the outlet port 28, and the conduits 31, 34. Thereafter, when the brake pedal 10 is released, the flow control valve 17 is downwardly depressed, against the upward urging force of the compression spring 26, by the hydraulic fluid within the conduits 31, 34, until the downwardly extending peripheral leg portion of the flat portion 18 of the flow control valve 17 contacts or engages the upper surface of the spring retainer 22. Accordingly, the hydraulic fluid within the conduits 31, 34 flows backwardly from the conduits 31, 34 to the outlet port 14 only via the oil passage 19 in the flow control valve 17 and the oil passages 25 in the spring retainer 22. Therefore, the reflux of the hydraulic fluid from each of the wheel cylinders 29, 29, 32, 32 is decreased since flow does not occur through the gap 27, the oil passage 19 and the oil passages 25, but only through the oil passages 19 and 25. It should be noted that the hydraulic fluid within the reservoir tank 13 is easily drawn into each of the wheel cylinders 29, 29, 32, 32, and it can be effectively possible therefore to let air out of each of the wheel cylinders 29, 29, 32, 32 by repeating the above-mentioned depression and release operations of the brake pedal 10.

Obviously, many modifications and variations of the present invention are possible in light of the above teachings. It is to be understood, therefore, that within the scope of the appended claims, the present invention may be practiced otherwise than as specifically described herein.

What is claimed as new and desired to be secured by Letters Patent of the United States is:

1. A flow control apparatus of a brake master cylinder, including the wheel cylinders, comprising:
    an outlet port formed in said master cylinder being fluidically communicated with each of said wheel cylindrs;
    a plug threadably secured into said outlet port so as to prevent flow about the threaded periphery of said plug between said plug and said outlet port;
    a valve chamber formed within said plug and having an opening therefrom hydraulically connected to said wheel cylinders;
    a flow control valve including a flat portion having an oil passage therethrough and a plurality of projecting portions on the end surface thereof facing said valve opening and being slidably disposed within said valve chamber, said projecting portions being arranged to contact the inner wall of said plug in which said valve chamber opening is formed so as to provide a stop for limiting movement of said valve in the direction of said valve opening wherein said flat portion of said valve is maintained spaced from said inner wall of said plug to provide a gap therebetween;
    a spring retainer having a pluralty of oil passages therethrough being fixed into said plug by pressing; and
    a compression spring interposed between said flow control valve and said spring retainer for urging said flow control valve in a direction toward said valve chamber opening so as to contact said projecting portions of said flow control valve with the inner wall of said plug.

2. A flow control apparatus of a brake master cylinder as set forth in claim 1, wherein said flow control valve further includes a longitudinal portion integrally formed with said flat portion and extending in the direction of said spring retainer from the end surface of said flat portion opposite that on which said projecting portions are disposed.

3. A flow control apparatus of a brake master cylinder as set forth in claim 2, wherein said spring retainer further includes a through passage for receiving said longitudinal portion of said flow control valve.

* * * * *